US008391370B1

(12) United States Patent
Mukherjee et al.

(10) Patent No.: US 8,391,370 B1
(45) Date of Patent: Mar. 5, 2013

(54) DECODING VIDEO DATA (75) Inventors: Debargha Mukherjee, Sunnyvale, CA (US); Wai-Tian Tan, Sunnyvale, CA (US); Chuohao Yeo, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 422 days.

(21) Appl. No.: 12/402,452

(22) Filed: Mar. 11, 2009

(51) Int. Cl.
*H04N 7/32* (2006.01)
*H04N 7/68* (2006.01)
*H04N 11/02* (2006.01)

(52) U.S. Cl. ......... 375/240.24; 375/240.25; 375/240.26; 375/240.27

(58) Field of Classification Search . 375/240.01–240.29
See application file for complete search history.

(56) References Cited

U.S. PATENT DOCUMENTS

| 6,993,076 | B1 * | 1/2006 | Comer et al. ............ 375/240.16 |
| 2006/0233252 | A1 * | 10/2006 | Bhattacharya et al. .. 375/240.16 |
| 2009/0003452 | A1 * | 1/2009 | Au et al. ................. 375/240.17 |
| 2009/0225869 | A1 * | 9/2009 | Cho et al. ................. 375/240.26 |
| 2009/0232198 | A1 * | 9/2009 | Cho et al. ................. 375/240.01 |
| 2009/0268809 | A1 * | 10/2009 | Cordara et al. .......... 375/240.12 |

OTHER PUBLICATIONS

Aaron et al. ("Wyner-Ziv Coding for video: Application to Compression and Error Resilience", Proceedings of the Data Compression Conference (DCC '03), 2003).*

* cited by examiner

*Primary Examiner* — Joseph Ustaris
*Assistant Examiner* — On S Mung (57) ABSTRACT

Decoding video data. Receive a first video stream including a first plurality of frames encoded at a first resolution, a second video stream including a second plurality of frames encoded at a second resolution and a residual bitstream encoded at a third resolution. The second plurality of frames correspond to the first plurality of frames encoded at the first resolution and the first resolution is greater than the second resolution and the third resolution is at least between the first and second resolutions. Side information determined based at least on the first plurality of frames and the second plurality of frames. The video data decoded based at least on one received frame of the first plurality of frames, at least one received frame of the second plurality of frames encoded at the second resolution, the residual bitstream encoded at the third resolution, and the side information.

20 Claims, 7 Drawing Sheets

DECODING VIDEO DATA

FIELD

Various embodiments of the present invention relate to the field of streaming media.

BACKGROUND

In video communications, there can be many types of losses, such as isolated packet losses or losses of complete or multiple frames. Breakups and freezes in video presentation are often caused by a system's inability to quickly recover from such losses. In a typical system where the video encoding rate is continuously adjusted to avoid sustained congestion, losses tend to appear as short bursts that span between one packet and two complete frames.

Current error concealment schemes exist that attempt to address this concern. However, current error concealment schemes are ineffective in various ways. For example, current error concealment schemes typically rely on the existence of intact pixels near the region to be concealed, making them ineffective against burst loss that span a complete frame or more. Moreover, current error concealment decisions are typically based on guesses, since the true likeness of the lost region is unknown. This means the concealment effort can sometimes inadvertently introduce larger errors.

BRIEF DESCRIPTION OF THE DRAWINGS

The accompanying drawings, which are incorporated in and form a part of this specification, illustrate embodiments of the present invention.

The drawings referred to in the description of embodiments should not be understood as being drawn to scale except if specifically noted.

DESCRIPTION OF EMBODIMENTS

Various embodiments of the present invention, decoding video data, are described herein. In one embodiment, a method for decoding video data is described. At least one video stream including a first plurality of frames encoded at a first resolution and a second plurality of frames encoded at a second resolution are received, wherein the second plurality of frames encoded at the second resolution correspond to the first plurality of frames encoded at the first resolution, and wherein the first resolution is greater than the second resolution. Side information is received related to the at least one video stream, wherein the side information is based at least in part on a comparison of the first plurality of frames and the second plurality of frames. The video stream is decoded based on at least one received frame of the first plurality of frames encoded at the first resolution, at least one received frame of the second plurality of frames encoded at the second resolution and the side information.

In another embodiment of the present invention, a method for encoding video data is described. The video data is encoded at a first resolution into a first video stream comprising a first plurality of frames. The first video stream is encoded at a second resolution into a second video stream comprising a second plurality of frames, and wherein the first resolution is greater than the second resolution. Residue is encoded based at least in part on a comparison of the first video stream to the second video stream into a third video stream. In one embodiment, a positive receipt acknowledgement for at least a subset of the first plurality of frames is received.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

For purposes of clarity and brevity, the instant description of embodiments and examples will specifically deal with video data. Embodiments of the present invention, however, are not limited solely to use with video data. Instead, the embodiments of the present invention are well suited to use with audio-based data, image-based data, web page-based data, graphic data and the like. Specifically, the embodiments of the present invention are directed towards any data transmitted over a manner that might incur transmission losses. Embodiments of the present invention provide for encoding and decoding, e.g., transforming, the video data to detect and conceal transmission errors.

Embodiments of the present invention employ an additional and independent lower resolution video stream, also referred to herein as a preview stream or thumbnail stream, to facilitate in the detection and concealment of transmission errors in a full resolution video stream. In various embodiments, there are a plurality of lower resolutions video streams. For compression efficiency, the full resolution video stream normally predicts from any past pictures and is restricted to predict from a positively acknowledged picture only when loss is detected. In various embodiments, a lower resolution stream always predicts from a positively acknowledged frame. The use of positively acknowledged frame for predictive encoding of a lower resolution video stream ensures that every received low resolution frame can be properly decoded. Furthermore, when at least a portion of the full resolution video stream is lost, a lower resolution frame serves as high confidence basis of what the lost portion resembles and can substantially enhance the effectiveness of receiver error concealment. It should be appreciated that even if a sequence of full resolution frames are lost together with corresponding lower resolution frames, the reception of a proximate lower resolution frame is sufficient to reconstruct a likeness of its corresponding full resolution frame, and can be immediately employed for concealment using previously received full resolution frames.

Embodiments of the present invention employ an additional layer of information to enhance the detection and concealing of transmission errors in a full resolution video stream. The additional layer of information or residue is correlated to high frequency information that is not incorporated into the independent lower resolution preview stream.

The addition of a second layer with information about the lost spatial frequencies can recover much of the lost frequencies in the downsampled layer. Unfortunately, during encoding, it is impossible to know which blocks would be lost and which of the blocks would have yielded a good match by motion search based on the low resolution preview. Therefore, a possible recourse to recovering the lost information, at least partially, in a rate-efficient manner is to use source coding with side information techniques, such as but not limited to Wyner-Ziv coding, where the decoder's error concealed frame is regarded as side information not available at the encoder.

If pure source coding of the enhancement layer is used, the rate overheads can be too high. For instance, if the enhancement layer is coded as in a spatially scalable coder, the overall rate will be at least as high as the rate required to code the video at full resolution using a single layer encoder. Alternatively, if pure channel coding were used on the coded video at full-resolution, for example by use of a Forward Error Correction (FEC) scheme, it can potentially provide lossless protection against network loss, however it would typically also require very high overheads. Distributed video coding based error-resilience schemes, such as Systematic Lossy Error Protection (SLEP), have lower overheads and provides lossy protection. However, SLEP assumes motion vectors (MVs) and coding modes to be recovered error-free. If a slice is lost, all the information in it including MV and coding modes is considered lost. Moreover, in a SLEP scheme, the absence of a preview version limits the quality of the error concealed version that is used as side information, thereby substantially degrading the coding efficiency of the Wyner-Ziv layer. The absence of the preview layer enables a SLEP scheme to save bit rate, however, its overall efficiency can be deficient to a two stage scheme.

The addition of a low resolution preview layer to standard full resolution bitstream can be very effective in error concealment since the decoder search operation can provide good matches in most cases. However, in areas of incorrect match, the error concealed version must rely on interpolation from the low resolution preview layer to create the final error concealed version. Accordingly, higher frequencies of the image which is lost during encoding remain uncovered.

Figure 1:
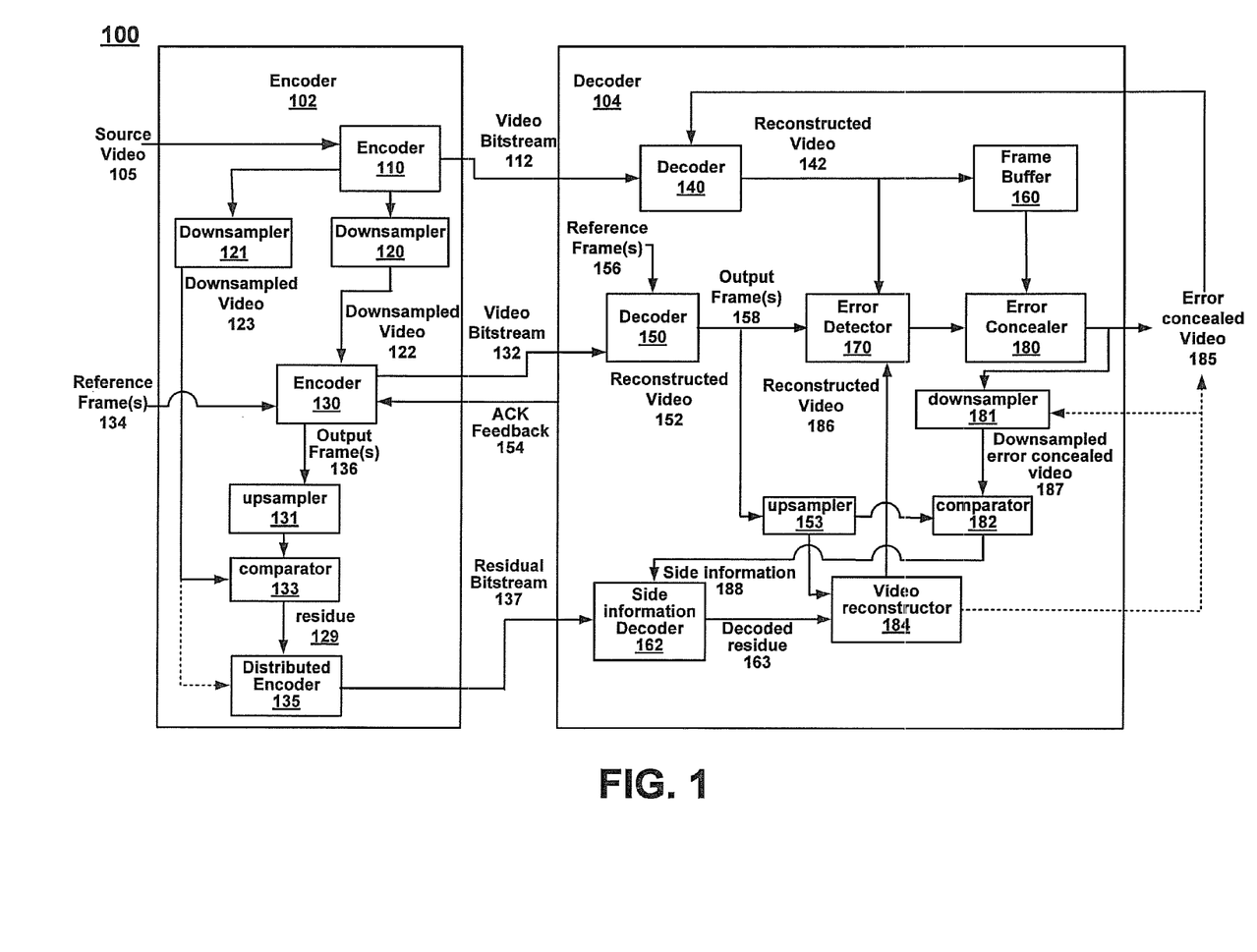
FIG. 1 illustrates a block diagram of a system for encoding and decoding video data, in accordance with one embodiment of the present invention.

FIG. 1 is a block diagram of a system 100 for encoding and decoding video data, in accordance with one embodiment of the present invention. System 100 includes encoder 102 and decoder 104. It should be appreciated that encoder 102 and decoder 104 are implemented within separate computer systems. In various embodiments, encoder 102 and decoder 104 are communicatively coupled over a network (not shown), e.g., a local area network (LAN), and intranet, the Internet, or other type of communication network. It should be appreciated that artifact encoder 102 and decoder 104 can be implemented as hardware, firmware, software and hardware, software and firmware, or hardware, software and firmware. Moreover, it should be appreciated that system 100 may include additional components that are not shown so as to not unnecessarily obscure aspects of the embodiments of the present invention.

In one embodiment, encoder 102 includes encoder 110, downsampler 120, downsampler 121, encoder 130 for encoding source video 105 at different resolutions, upsampler 131, comparator 133 and distributed encoder 135. For example, in one embodiment, encoder 102 is configured to receive source video 105 and encode source video 105 into video bitstream 112. Downsampler 120 is configured to downsample the output of encoder 102, generating downsampled video 122. It should be appreciated that downsampled video 122 can be downsampled by any factor, resulting in downsampled video 122 having a lower resolution than video bitstream 112, e.g., a frame of downsampled video 122 has fewer pixels than a frame of video bitstream 112. In one embodiment, downsampled video 122 also includes fewer frames than video bitstream 112, e.g., downsampled video 122 has a lower frame rate than video bitstream 112. In one embodiment, downsampler 120 downsamples the input video data by a factor of four in each dimension, yielding downsampled video 122 having a bit overhead of roughly one-sixteenth the bit rate of video bitstream 112.

In one embodiment, downsampler 121 is configured to downsample the output of encoder 102, generating downsampled video 123. It should be appreciated that downsampled video 123 generated by 121 can be downsampled by any factor smaller than that used in downsampler 120, resulting in downsampled video 123 having a resolution lower or equal to that of video bitstream 112 but higher than that of video bitstream 132; e.g., a frame of downsampled video 123 has equal or fewer pixels than a frame of video bitstream 112, but more pixels than that of video bit-stream 132. In one embodiment, downsampled video 123 also includes fewer or equal number of frames than video bitstream 112, but equal number of frames as video 132, e.g., downsampled video 123 has a lower or the same frame rate as video bitstream 112, and the same frame rate as video bit-stream 132.

Encoder 130 receives downsampled video 122 and encodes downsampled video 122 into video bitstream 132. In one embodiment, encoder 130 is configured to encode video bitstream 132 such that frames of bitstream 132 are predicted only from frames that have been positively acknowledged by a receiver, e.g., decoder 104, as acknowledgement (ACK) feedback 154. By predicting from frames that are positively acknowledged as recited, the present embodiment ensures that every received frame of video bitstream 132 is decodable. In one embodiment, the frames of video bitstream 132 can be used to facilitate in the concealment of lost portions of a frame, and to facilitate in controlling subsequent error propagation.

In various embodiments, encoder 130 utilizes reference frame(s) 134 to perform encoding. A reference frame 134 can be selected from a previous output frame 136 or a previous (positively acknowledged) target frame of downsampled video 122. It should be appreciated that the previous (usually positively acknowledged) target frame of downsampled video is available as reference frame 134 because downsampled video 122 is a degraded version of reconstructed video 142.

Upsampler 131 is configured to upsample video bitstream 132 from encoder 130. In one embodiment, the upsampler 131 upsamples the reconstructed video to the resolution of bitstream 112. In this case, downsampler 121 is not necessary. In another embodiment, upsampler 131 upsamples to the resolution of the output of downsampler 121, which is higher than the resolution of downsampled video 122, but lower than that of video bitstream 112. In another embodiment, the upsampling of video bitstream 132 is based on video bitstream 132 and previously acknowledged frames.

Comparator 133 is configured to compare the upsampled version of bitstream 132 to the downsampled video 123. In one embodiment, the comparator 133 determines the difference between upsampled version of video bitstream 132 and downsampled video 123. It should be appreciated that the output of the comparator 133 is residue 129.

Distributed encoder 135 is configured to encode residue 129 into residual bitstream 137. In one embodiment, distributed encoder is an encoder with side information. In another embodiment, distributed encoder 135 is a Wyner-Ziv encoder. In one embodiment, residual bitstream 137 is a Wyner-Ziv layer. It should be appreciated that residual bitstream 137 is additional information that is sent to decoder 104 in addition to full resolution video bitstream 112 and lower resolution video bitstream 132. It should be appreciated that residue 129 is, in part, high frequency information that is not incorporated into video bitstream 132 due to the downsampling at downsampler 120. It should also be appreciated that the distributed encoder 135 introduces ambiguity into the residual bitstream 137 to reduce bit-rate and that side information 188 available at the side information decoder 162, as discussed later, will be able to resolve the ambiguity. It should also be appreciated that distributed encoder 135 receives information about downsampled video 123 to make the appropriate coding decisions, even though the information is not required by side information decoder 162 to decode.

In one embodiment, distributed encoder 135 processes macro-blocks from the residue 129 and the downsampled video 123 in a manner to perform a classification resulting in encoding decisions, where the classification information is transmitted in the residual bitstream 137. Based on the classification, the macroblocks are either: 1) not coded at all, 2) coded as in a regular coder using an entropy coder, 3) coded using distributed source coding techniques in one or more classes with varying rates. In one embodiment, the macroblock classification is performed based on a combination of the alternating current (AC) energy in the residue 129 and the AC energy in the upsampled video output of 131. It should be appreciated that in a video context, AC energy is that of the high frequency image transform (e.g. DCT) coefficients.

In another embodiment, classification is performed based on the value of the ratio of the AC energy in the residue 129 and the AC energy in the upsampled video output of 131. Macroblocks where the ratio is lower than a threshold T1 are not coded at all. Macroblocks where the ratio is larger than another threshold T2 (T2>T1) are coded using a regular entropy coder without any distributed coding. Macroblocks with intermediate values of the threshold are further classified into an arbitrary number of classes, and for each class, a form of distributed encoding is used.

In one embodiment, the transform coefficients of the distributed coded blocks are quantized and cosets are computed with parameters matched to the statistics of each class. The coset indices are then coded using an entropy coder. In another embodiment, one or more higher significant bits from the coset indices are separated out, followed by coding the lower significant symbols using entropy coding, and coding the higher bits using channel coding where only the parity or syndrome bits are transmitted. Along with classification indices, additional information about the statistics and noise characteristics of each class may be transmitted to the decoder to enable it to determine the parameters used for encoding the blocks.

Figure 2:
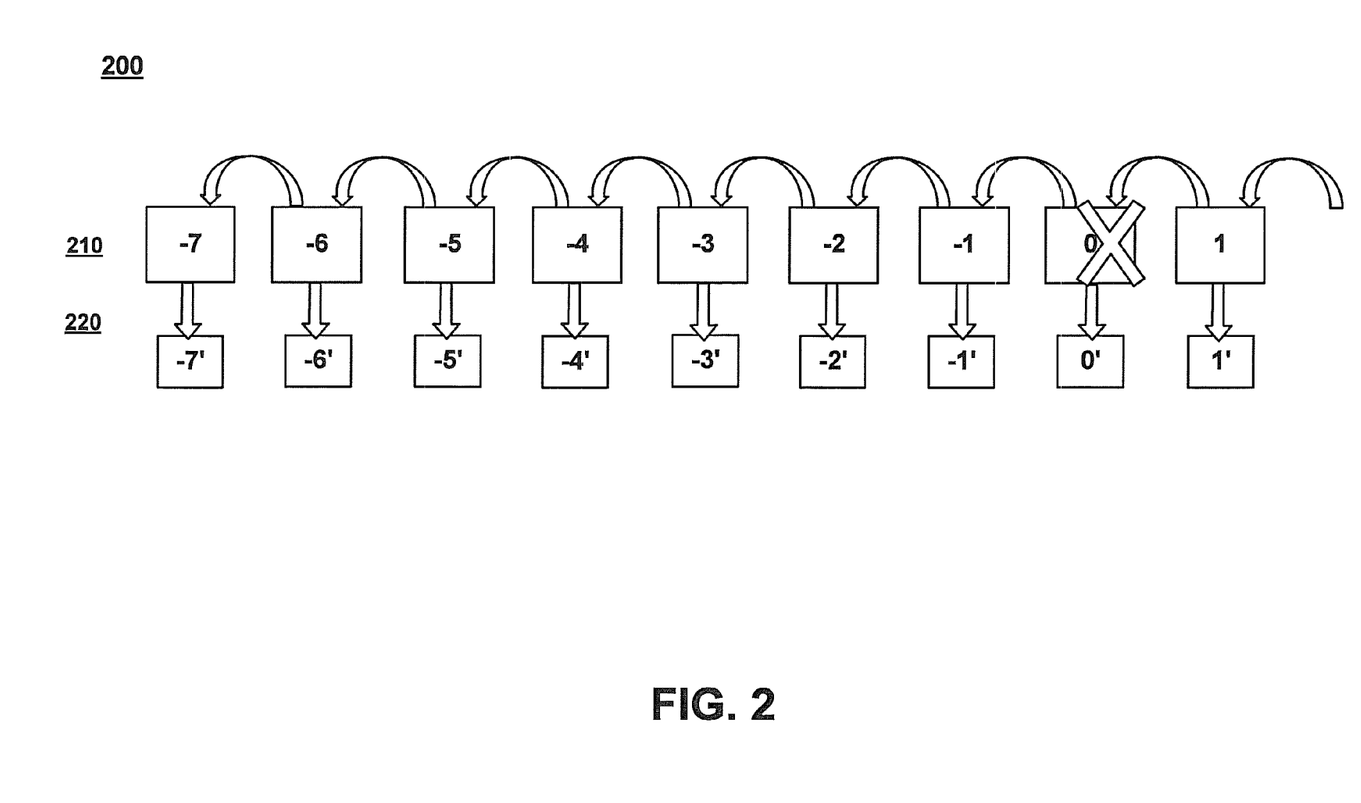
FIG. 2 illustrates example frames of a full resolution stream and a preview stream, in accordance with one embodiment of the present invention.

FIG. 2 illustrates example frames 200 of a full resolution stream 210 and a preview stream 220, e.g., a lower resolution stream, in accordance with one embodiment of the present invention. Frames of preview stream 220 are predicted only from positively acknowledged frames from the receiver, e.g., decoder 140 of FIG. 1. In one embodiment, preview stream 220 is any lower resolution stream.

For instance, full resolution stream 210 and preview stream 220 are transmitted to a receiver. Predictive frames of full resolution stream 210 are encoded in accordance with the coding standard. For example, predictive frames of full resolution stream 210 can be dependent on frames that are not positively acknowledged by the receiver.

In one embodiment, the preview stream encoder, e.g., encoder 130, receives a positive acknowledgement 154 that a frame of full resolution stream 210 has been fully received. The preview stream encoder encodes predictive frames using positively acknowledged frames of full resolution stream 210. In another embodiment, preview stream 220 facilitates in effective error detection and error concealment.

For example, frames $-7$, $-7'$, $-6$, $-6'$, $-5$, $-5'$, $-4$, $-4'$, $-3$, $-3'$, $-2$, $-2'$, $-1$ and $-1'$ have been transmitted to a receiver. At the time that frame $-0'$ is being encoded for transmission to the receiver, only full resolution frames $-7$ and $-6$ have been positively acknowledged. In the instant example, where frame $0'$ is a predictive frame, it is predictively encoded using at least one of frames $-7$ and $-6$. It should be appreciated that a full resolution frame and its corresponding preview frame, e.g., frames $0$ and $0'$, are transmitted for contemporaneous receipt and decoding, and that while full resolution frame and preview frame may predictively rely on different frames, they are transmitted for receipt for contemporaneous decoding.

With reference to FIG. 1, it should be appreciated that encoder 110, encoder 130 and distributed encoder 135 of encoder 102 illustrate an example embodiment. In other embodiments, encoder 102 may include any number of encoders, and that the present embodiment illustrated in FIG. 1 is shown for ease of explanation. For example, encoder 102 may use the same encoder for encoding video bitstream 112 and video bitstream 132. Accordingly, any encoder that is configured to encode data into multiple video bitstreams having different resolutions may be used. Also, it should be appreciated that video encoder 102 can implement any video encoding standard, including, but not limited to: H.261, H.263, H.264, MPEG-1, MPEG-2, MPEG-4 and other video encoding standards.

Encoder 102 is configured to transmit video bitstream 112, video bitstream 132 and residual bitstream 137 to decoder 104. Decoder 104 includes decoder 140, decoder 150, downsampler 181, comparator 182, upsampler 153, side information decoder 162, video reconstructor 184, frame buffer 160, error detector 170 and error concealer 180. Decoder 140 is configured to receive and decode video bitstream 112 into reconstructed video 142. As presented herein, reconstructed video 142 is also referred to as a full resolution video. Frames of reconstructed video 142 are stored in frame buffer 160. It should be appreciated that any number of frames can be stored in frame buffer 160, and is dependent on the capacity of frame buffer 160 and the size of the individual frames.

Decoder 150 is configured to receive and decode video bitstream 132 into reconstructed video 152. As presented herein, reconstructed video 152 is also referred to as a lower resolution video, a preview video, or a thumbnail video. In particular, reconstructed video 152 is a lower resolution representation of reconstructed video 142. In one embodiment, reconstructed video 152 is based on video bitstream 132 that was predictably encoded from frames that were positively acknowledged by decoder 104. Therefore, frames of reconstructed video 152 are each decodable.

In various embodiments, decoder 150 utilizes reference frame(s) 156 to perform decoding. A reference frame 156 can be selected from a previous output frame of decoder 150 or a downsampled frame of reconstructed video 142 that is stored in frame buffer 160. It should be appreciated that a downsampled frame of reconstructed video 142 is the same as a frame of downsampled video 122 when there is no loss.

Side information decoder 162 is configured to receive both residual bitstream 137 and side information 188 and decode residual bitstream into decoded residue 163. In one embodiment, side information decoder 162 is a Wyner-Ziv decoder. It should be appreciated that the side information 188 received by the side information decoder 162 is known only at the decoder and is not known at the encoder.

Upsampler 153 is configured to upsample reconstructed video 152. In one embodiment, reconstructed video 152 is upsampled to the same resolution as reconstructed video 142. In another embodiment, upsampler 153 is identical to upsampler 131 at the encoder and accordingly both having identical inputs and outputs. In this case, the resolution of the upsampled video output is the same as the resolution of the downsampled video 123 and residue 129. In another embodiment, the upsampler 153 is based on reconstructed video 152 and previously acknowledged frames.

Downsampler 181 is configured to downsample full resolution error concealed video 185 into a downsampled error concealed video 187. It should be appreciated that downsampler 181 should downsample by a factor such that the downsampled video 187 has a resolution equal to that of the output from upsampler 153. It should be appreciated that downsampler 181 can be identical to downsampler 121.

The comparator 182 is configured to receive and compare downsampled error concealed video 187 to upsampled reconstructed video 152. In another embodiment, the comparator 182 determines the difference between the upsampled reconstructed video 152 and downsampled error concealed video 187. It should be appreciated that the output of comparator 182 is side information 188 that is received by side information decoder 162 for decoding residual bitstream 137 into decoded residue 163.

Video reconstructor 184 is configured to receive and combine both decoded residue 163 and the upsampled reconstructed video 152 into reconstructed video 186. In other words, in one embodiment, the functionality of video reconstructor 184 is to add improved high frequency information to upsampled low frequency information. In another embodiment, video reconstructor 184 adds decoded residue 163 and the upsampled reconstructed video 152 output from upsampler 153. In a further embodiment, reconstructed video 186 has a lower resolution than reconstructed video 142. In another embodiment, reconstructed video 186 has a higher resolution than reconstructed video 152. It should be appreciated that reconstructed video 186 corresponds to reconstructed video 142 and reconstructed video 152. In one embodiment, reconstructed video 186 is received by error detector 170. It should be appreciated that if the decoded residue 163 is a full resolution video, then the output of the video constructor 184 is full resolution error concealed video 185. In one embodiment, error concealed video 185 that is the output of video reconstructor 184 is the input to downsampler 181. It should also be appreciated the distributed encoder 135, side information decoder 163 and video reconstructor 184 operate at the same resolution as the output of downsampler 121.

In one embodiment, error detector 170 is configured to determine whether a frame of reconstructed video 142 includes an error. In one embodiment, after a transmission error occurs, error detector 170 compares a lower resolution frame of reconstructed video 186 and the corresponding full resolution frame of reconstructed video 142 to localize blocks which are not consistent with the lower resolution frame. In one embodiment, error detector 170 compares a lower resolution frame of reconstructed video 152 and the corresponding full resolution frame of reconstructed video 142. In one embodiment, blocks of pixels of the full resolution frame are downsampled to the resolution of the lower resolution frame, and the downsampled blocks of the full resolution frame are compared to the collocated blocks of pixels of the lower resolution frame. In one embodiment, a mean square error (MSE) is calculated between the downsampled blocks of the full resolution frame and the collocated blocks of pixels of the lower resolution frame.

In one embodiment of side-information decoder 162 when no channel coding is used, transforms are computed on macroblocks of side-information 188, followed by decoding the transmitted coset codes to the nearest quantized transform value to the corresponding side-information transform value producing the same coset index value. In another embodiment where additional channel coding layers are included in addition to entropy coded lower significant coset symbols, first the lower significant coset indices are entropy decoded, then soft probabilities of channel coded bits are computed based on those lower significant coset indices, and finally the soft probabilities are used as inputs to a soft-input channel decoder that decodes the additional channel coded bits. The channel coded bits and the lower significant coset values are then combined to yield the final decoded coset value. In another embodiment, optimal MSE reconstruction is conducted on the coset indices decoded.

For example, in one embodiment, the lower resolution frame and the corresponding full resolution frame are compared by examining each non-overlapping 16×16 block of pixels in the reconstructed frame, and computing the MSE between its down-sampled 4×4 block of pixels and the collocated block in the preview frame.

Figure 3:
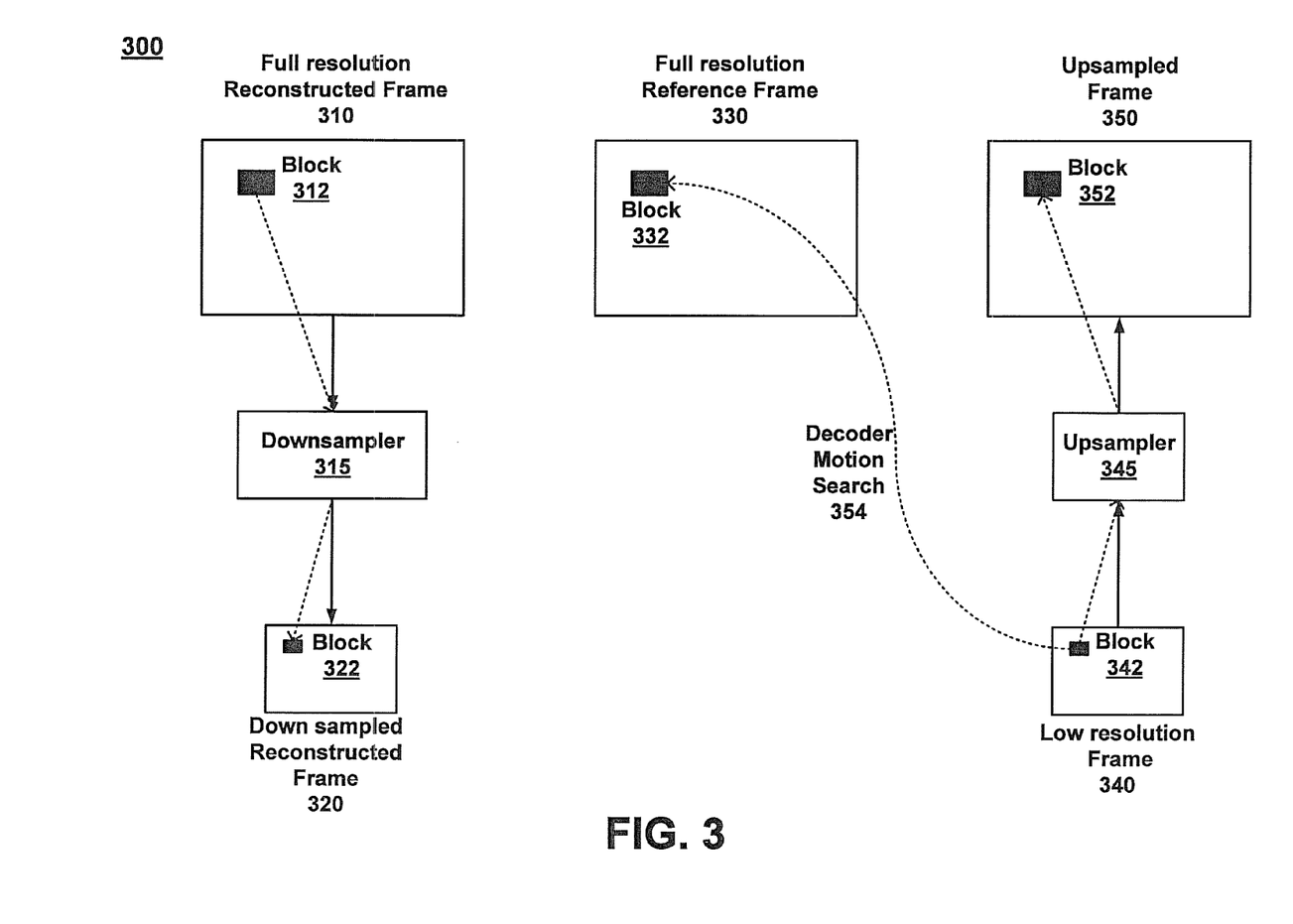
FIG. 3 illustrates an example error detection and concealment in a full resolution video frame using a low resolution frame, in accordance with one embodiment of the present invention.

FIG. 3 illustrates an example error detection and concealment 300 in a full resolution video frame using a frame of a lower resolution video compared to a full resolution video, in accordance with one embodiment of the present invention. As shown in FIG. 3, full resolution reconstructed frame 310 is downsampled at downsampler 315 to generate downsampled reconstructed frame 320. It should be appreciated that downsampled reconstructed frame 320 is downsampled to have the same resolution as low resolution frame 340.

For example, for block 312, the MSE between block 322 and 342 is computed. In one embodiment, a threshold is then applied to determine if the full resolution block 312 is consistent with low resolution block 342. In one embodiment, the threshold is computed from past correctly received full resolution frames and preview frames to adapt to both preview reconstruction quality and video content.

With reference to FIG. 1, in various embodiments, error detector 170 is used for controlling error propagation. The lower resolution frames of reconstructed video 186 provide for the detection and correction of propagated concealment errors that grow large through normal decoding. Any block in reconstructed video 142 with a detected discrepancy from the lower resolution frame that satisfies the threshold can be corrected using concealment, e.g., at error concealer 180. In one embodiment, the lower resolution frames of reconstructed video 156 provide for the detection and correction of propagated concealment errors that grow large through normal decoding.

With reference to FIG. 2, when at least a portion of full resolution stream 210 is lost, e.g., frame 0, frame 0' serves as a high confidence basis of what frame 0 resembles and can substantially enhance the effectiveness of receiver error concealment. Similarly, even if frames −2, −1, and 0 are lost together with their previews, the reception of the preview frame 1' for frame 1 is sufficient to reconstruct a likeness of frame 1, and can be immediately employed for concealment using the previously received frame −3.

With reference to FIG. 1, error concealer 180 is configured to conceal detected error in a full resolution frame of reconstructed based at least in part on comparing the full resolution frame with its corresponding lower resolution frame. In one embodiment, error concealer 180 replaces the missing portion of the full resolution frame with a collocated portion of the lower resolution frame. In another embodiment, error concealer 180 utilizes at least a portion of the lower resolution frame that is collocated to the missing portion of the full resolution frame as a descriptor in performing a motion search on a downsampled version of at least one prior full resolution frame. The missing portion is then replaced with a portion of a prior full resolution frame. In another embodiment, error concealer 180 replaces the missing portion of the full resolution frame by merging a collocated portion of the lower resolution frame with a selected portion of a prior full resolution frame. In one embodiment, there is a reasonable quality of error concealed frames when packets are lost with a rate overhead of on or about 10% of the standard bitstream.

With reference to FIG. 3, in accordance with one embodiment, if full resolution block 312 is found to be inconsistent with block 342, block 342 is used as a descriptor to perform decoder motion search 354 in at least one smoothed full resolution reference frame. For purposes of the instant description of embodiment, smoothing refers to the removal of high frequency information from a frame. For example, a reference frame is smoothed with the same antialiasing filter used in downsampler 315 to avoid inadvertent inclusion of high spatial frequency during subsequent decoder motion search 354.

In various embodiments, a full resolution reference frame is a previously received and reconstructed full resolution frame. In one embodiment, the reference frames are error free frames. However, it should be appreciated that in other embodiments, the full resolution reference frame may itself include error concealed portions, and that it can be any full resolution frame of reconstructed video. However, it is noted that buffer size might restrict the number of potential reference frames, and that typically the closer the reference frame is to the frame currently under error concealment, the better the results of motion search 354.

In one embodiment, the predictor block with the smallest MSE, e.g., block 332 in, is one candidate for error concealment. For example, consider where block 332 is the best match found by decoder motion search 354. In one embodiment, low resolution frame 340 is upsampled at upsampler 345 to generate upsampled frame 350. It should be appreciated that upsampled frame 350 is downsampled to have the same resolution as full resolution reconstructed frame 310. In one embodiment, a choice is then made between block 332 and the upsampled block 352 for the concealment. In one embodiment, if the smallest MSE is too high, then upsampled block 352 is selected for error concealment. In one embodiment, if the smallest MSE is not too high, then block 332 is selected for error concealment. In another embodiment, block 332 and upsampled block 352 are merged for concealment. The final error concealed frame is placed in the reference frame buffer of the full resolution decoder, e.g., decoder 140 of FIG. 1, for subsequent decoding.

In one embodiment, the decoding process that generates reconstructed video 186 is iterated and consequently improves the error concealed video 185. For example, an iteration of reconstructed video 186 is received by the error detector 170 and subsequently received by the error concealer 180 which consequently generates an iteration of error-concealed video 185 that is downsampled to downsampled error concealed video 187. Comparator 182 receives an iteration of downsampled error concealed video 187 and corresponding upsampled reconstructed video 152 and outputs an iteration of side information 188. Side information decoder 162 receives and decodes the iteration of side information 188 and corresponding residual bitstream 137 to an iteration of decoded residue 163. Video reconstructor 184 receives both the iteration of decoded residue 163 and corresponding upsampled reconstructed video 152 and generates an iteration of reconstructed video 186 which is received by error detector 170 and subsequently received by the error concealer 180 which consequently generates another iteration of reconstructed video 186 which is an improved version of the prior iteration of reconstructed video 186. In one embodiment, the decoding process that generates reconstructed video 186 is iterated at least two times.

Figure 4:
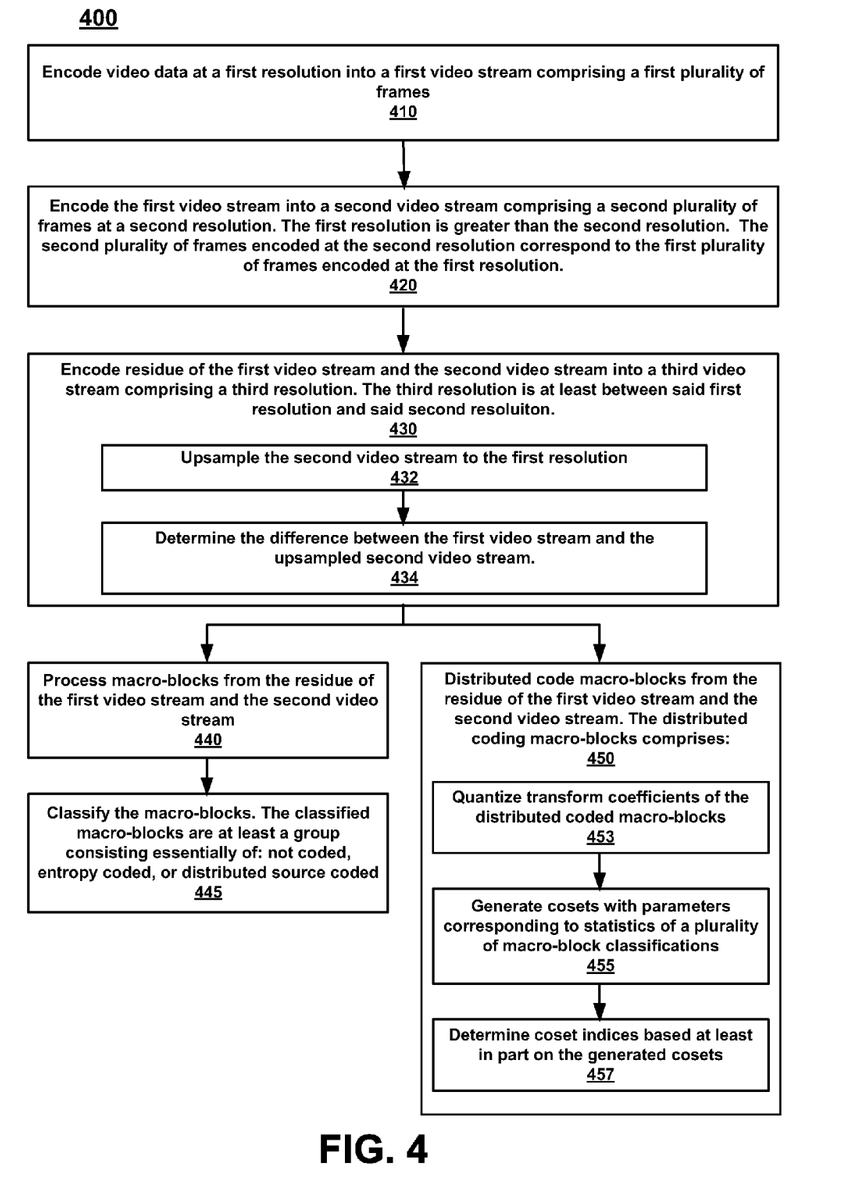
FIG. 4 illustrates a flowchart illustrating a process for encoding video data, in accordance with one embodiment of the present invention.

FIG. 4 is a flowchart illustrating a process 400 for encoding video data, in accordance with one embodiment of the present invention. In one embodiment, process 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 400 is performed by encoder 102 of FIG. 1.

At block 410 of process 400, video data is encoded at a first resolution, e.g., full resolution, into a first video stream including a first plurality of frames.

At block 420, the first video stream is encoded into a second video stream comprising a second plurality of frames at a second resolution. The first resolution is greater than the second resolution. The second plurality of frames encoded at the second resolution correspond to the first plurality of frames encoded at the first resolution.

In one embodiment, the second resolution is downsampled by a factor of four in each dimension relative to the first resolution. In one embodiment, at least a subset of the second plurality of frames is predictively encoded based on the positively acknowledged frames of the first plurality of frames.

It should be appreciated that blocks 410 and 420 are performed for a full resolution frame and a corresponding lower resolution frame at substantially the same time. For example, encoder 102 of FIG. 1 performs the full resolution encoding and the corresponding lower resolution encoding for a frame at the same or overlapping times. In another embodiment, blocks 410, 420 and 430 are performed at substantially the same time. In one embodiment, the first video stream and the second video stream are transmitted as a combined video stream. It should be appreciated that in other embodiments, the first, second and third video streams can be transmitted separately.

In one embodiment, as shown at block 430, residue based at least in part on a comparison of the first video to the second video stream is encoded into a third video stream. The comparison of the first video to second video stream is performed by upsampling the second video stream to the first resolution, shown at block 432, and determining the difference between the first video stream and the upsampled second video stream, shown at block 434. In one embodiment, the residue is at least between the first resolution and the second resolution.

In one embodiment, as shown at block 440, macro-blocks are processed from the residue of the first video stream and the second video stream. As shown at block 445, the macro-blocks are classified. The classified macro-blocks are at least a group consisting essentially of: not coded, entropy encoded, or distributed source coded.

In one embodiment, as shown at block 450, macro-blocks are distributed source coded from the residue of the first video stream and the second video stream. At block 453, the transform coefficients of the distributed coded macro-blocks are quantized. At block 455, cosets are generated with parameters corresponding to statistics of a plurality of macro-block classifications. At block 457, coset indices are determined based at least in part on the generated cosets.

Figure 5A:
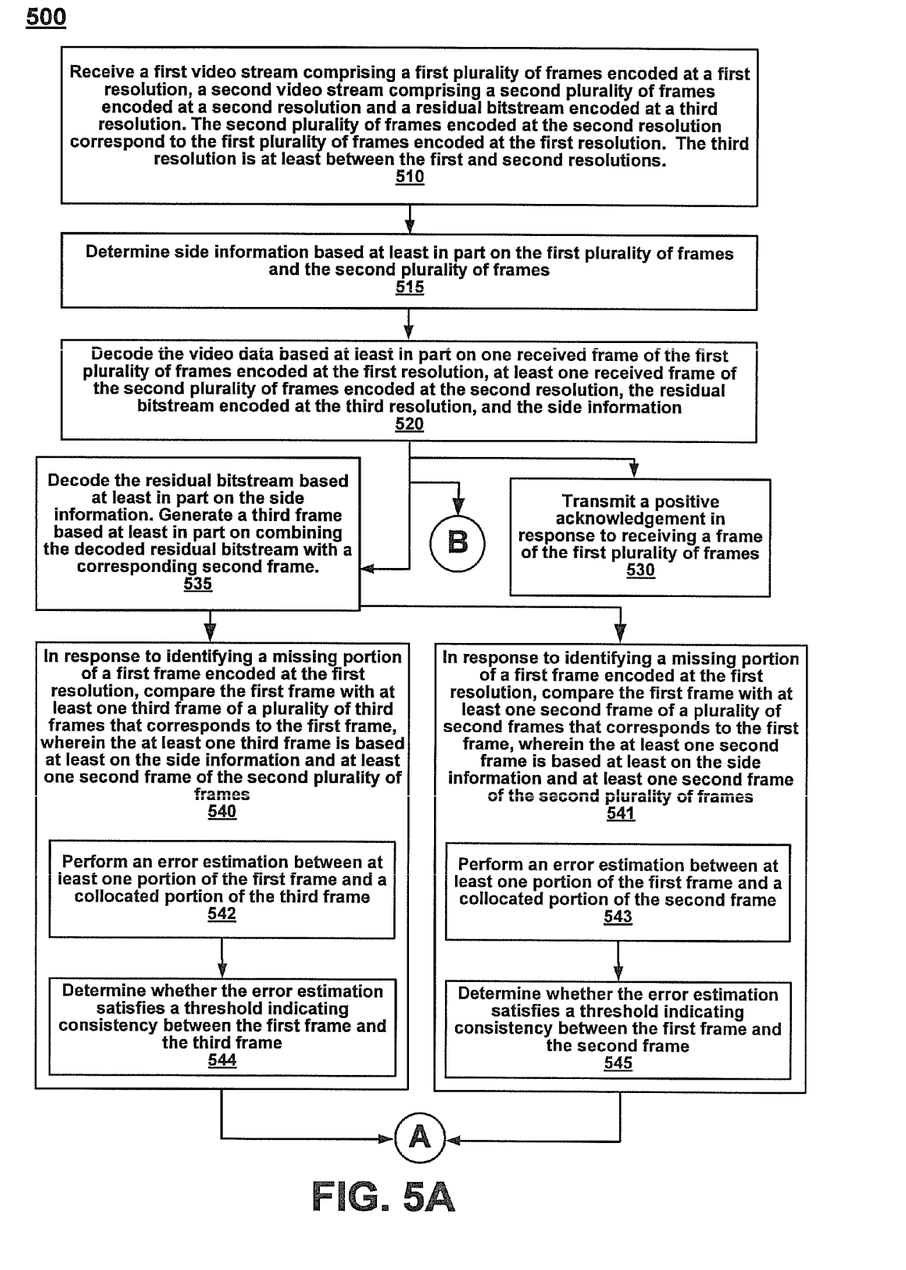
FIGS. 5A, 5B and 5C illustrate a flowchart illustrating a process for decoding video data, in accordance with one embodiment of the present invention.
Figure 5B:
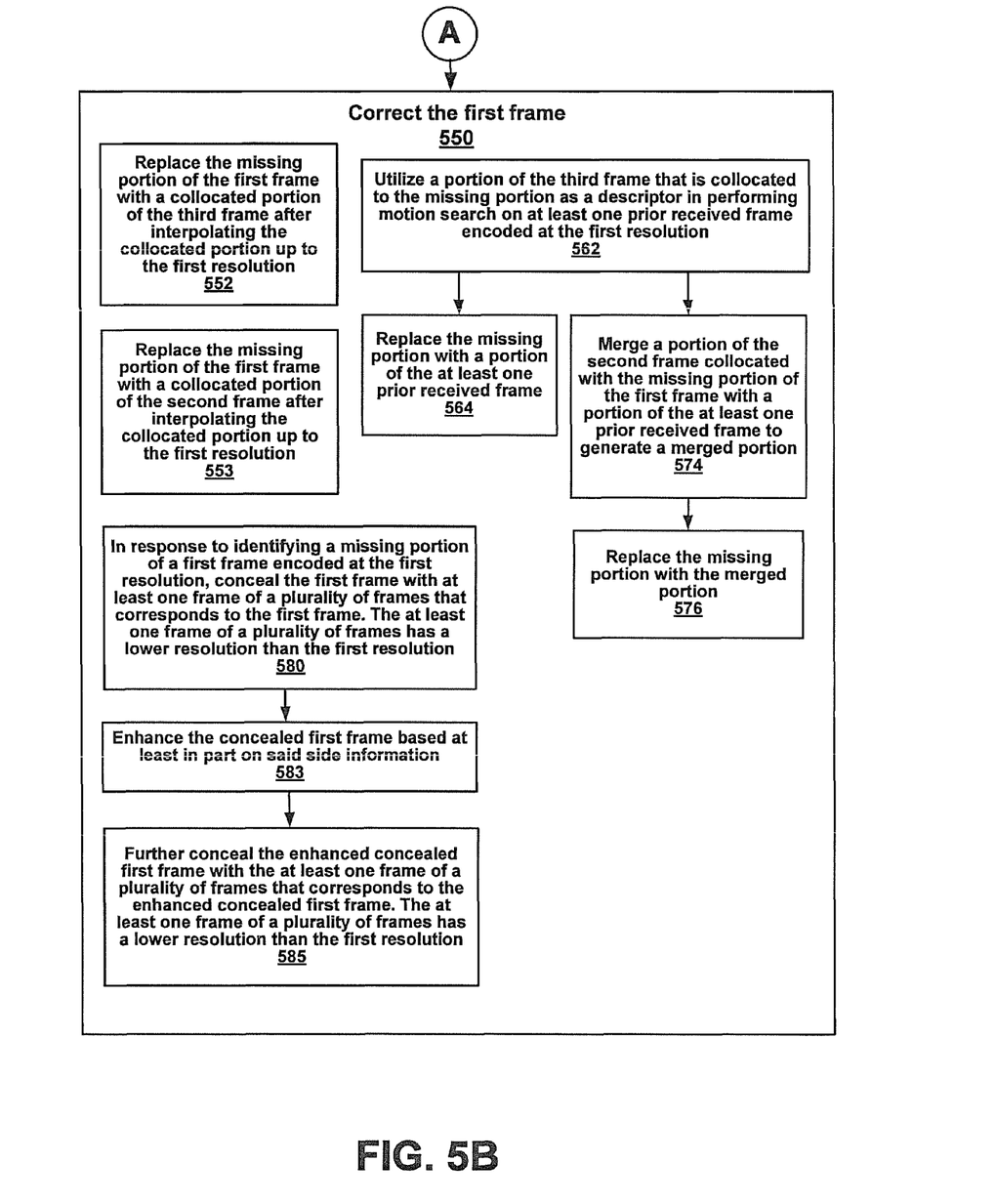

FIGS. 5A and 5B are a flowchart illustrating a process 500 for decoding video data, in accordance with one embodiment of the present invention. In one embodiment, process 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 500 is performed by decoder 104 of FIG. 1.

With reference to FIG. 5A, at block 510 of process 500, a first video stream is received comprising a first plurality of frames encoded at a first resolution, a second video stream comprising a second plurality of frames encoded at a second resolution and a residual bitstream encoded at a third resolution. The second plurality of frames encoded at the second resolution correspond to the first plurality of frames encoded at the first resolution. The first resolution is greater than the second resolution. The third resolution is at least between the first and second resolutions. In one embodiment, the second plurality of frames is predictively encoded based on positively acknowledged frames of the first plurality of frames.

At block 515, the decoder determines side information based at least in part on the first plurality of frames and the second plurality of frames At block 520, video data is decoded based at least in part on one received frame of the first plurality of frames encoded at the first resolution, at least one received frame of the second plurality of frames encoded at the second resolution, the residual bitstream encoded at the third resolution, and the side information. In one embodiment, the video data is decoded based on a set of received frames of the first plurality of frames encoded at the first resolution and a set of received frames of the second plurality of frames encoded at the second resolution. In another embodiment, at least one received frame of the first plurality of frames and at least one received frame of the second plurality of frames are the most recently received frames of the first plurality of frames and the second plurality of frames, respectively.

In one embodiment, as shown at block 530, a positive acknowledgement is transmitted in response to receiving a frame of the first plurality of frames.

In one embodiment, as shown at block 535, the residual bitstream is decoded based at least in part on the side information. A third frame is generated based at least in part on combining the decoded residual bitstream with a corresponding second frame.

In one embodiment, as shown at block 540, in response to identifying a missing portion of a first frame encoded at the first resolution, the first frame is compared with at least one third frame of a plurality of third frames that corresponds to the third frame. In another embodiment, at block 541, in response to identifying a missing portion of a first frame encoded at the first resolution, the first frame is compared with at least one second frame encoded at the second resolution that corresponds to the first frame.

In one embodiment, as shown at block 542, error estimation between at least one portion of the first frame and a collocated portion of the third frame is performed. In one embodiment, the error estimation is between at least one downsampled portion of the first frame and a collocated portion of the third frame is performed. In another embodiment, at block, 543, error estimation between at least one portion of the first frame and a collocated portion of the second frame is performed. In one embodiment, the error estimation is between at least one downsampled portion of the first frame and a collocated portion of the second frame is performed.

At block 544, a determination is made whether the error estimation satisfies a threshold indicating consistency between the first frame and the third frame. In one embodiment, at block 545, a determination is made whether the error estimation satisfies a threshold indicating consistency between the first frame and the second frame.

With reference to FIG. 5B, in one embodiment, as shown at block 550, the first frame is corrected based at least in part on the comparing the first frame with the third frame. In one embodiment, the first frame is corrected based at least in part on the comparing the first frame with the second frame.

In one embodiment, as shown at block 552, the missing portion of the first frame is replaced with a collocated portion of the third frame, after the collocated portion is interpolated up to the first resolution. In another embodiment, at block 553, the missing portion of the first frame is replaced with a collocated portion of the second frame, after the collocated portion is interpolated up to the first resolution.

In another embodiment, as shown at block 562, a portion of the third frame that is collocated to the missing portion is utilized as a descriptor in performing motion search on at least one prior received frame encoded at the first resolution. In another embodiment, a portion of the second frame that is collocated to the missing portion is utilized as a descriptor in performing motion search on at least one prior received frame encoded at the first resolution. In one embodiment, the motion search is performed on a downsampled version of at least one prior received frame encoded at the first resolution.

At block 564, the missing portion is replaced with a portion of the at least one prior received frame. In another embodiment, as shown at block 574, a portion of the third frame collocated with the missing portion of the first frame is merged with a portion of the at least one prior received frame to generate a merged portion. It should be appreciated that the merging is performed at the first resolution. In another embodiment, a portion of the second frame collocated with the missing portion of the first frame is merged with a portion of the at least one prior received frame to generate a merged portion. At block 576, the missing portion is replaced with the merged portion.

In one embodiment, at block 580, the first frame is concealed with at least one frame of a plurality of frames that corresponds to the first frame. The at least one frame of a plurality of frames has a lower resolution than the first resolution. At block 583, the concealed first frame is enhanced based at least in part on said side information. At block 585, the enhanced concealed first frame is further conceal with the at least one frame of a plurality of frames that corresponds to the enhanced concealed first frame. The at least one frame of a plurality of frames has a lower resolution than the first resolution. It should be appreciated that there is at least one iteration of the embodiments described at block 580, block 583 and block 585.

Figure 5C:
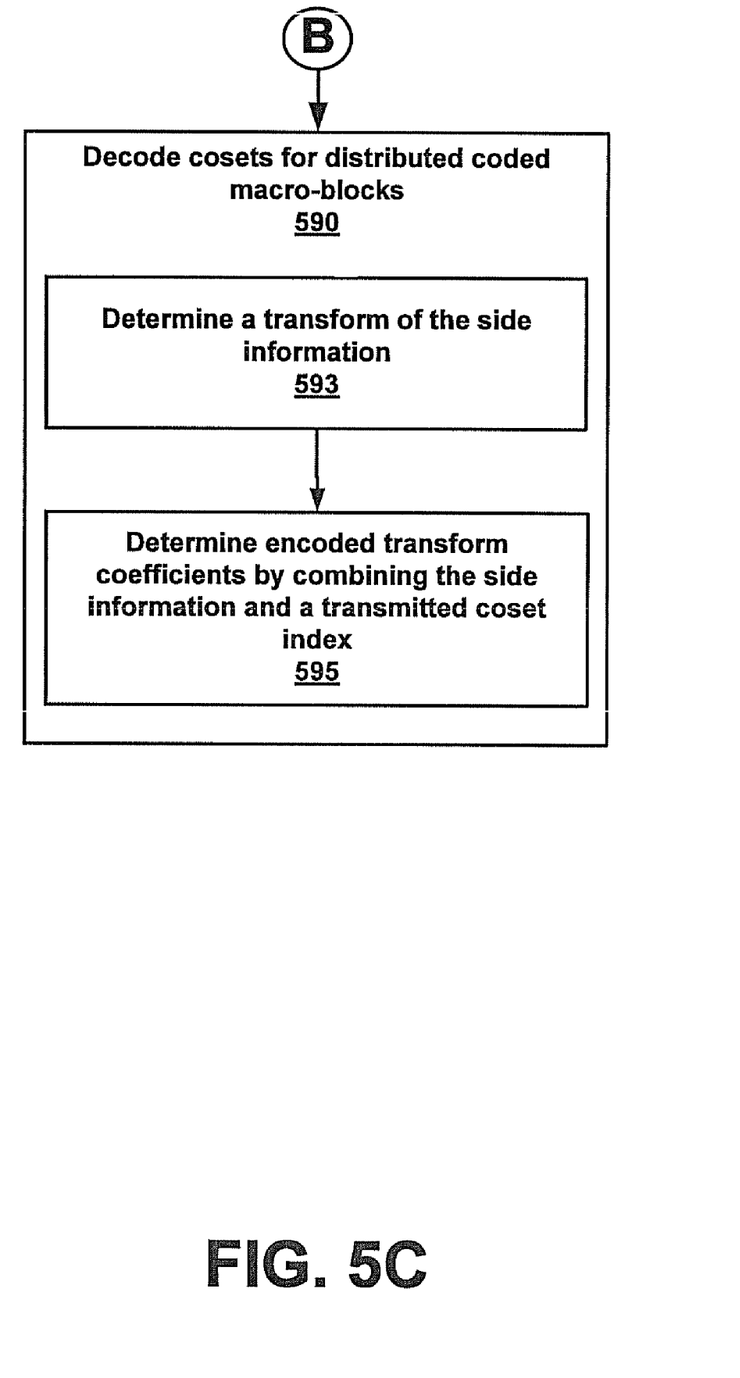

In one embodiment, at block 590 of FIG. 5C, cosets are decoded for distributed coded macro-blocks. At block 593, a transform of the side information is determined. At block 595, encoded transform coefficients are determined by combining the side information and a transmitted coset index. In one embodiment, the coset index is mapped to the quantization index that is closest to the side information and having the same coset value.

It should be appreciated that embodiments of the present invention can also be described as follows. It should be appreciated that the following references and/or equations are examples only and embodiments of the present invention should not be construed as limited by such examples.

The reconstructed frame, F, is the frame that is required to be protected. The preview layer is coded at resolution $2^{-R}$ of horizontal and vertical dimensions. In one embodiment, R is 2. The upsampled preview layer is $F_c$. In other words, $F_c$ is the coarse version of F. In one embodiment, $F_c$ is upsampled to the full resolution.

The error-concealed frame generated at the decoder by the decoder motion search is $F_{erc,0}$. It should be appreciated that a goal is to code F lossily assuming it is to be decoded with presence of side information, $F_{erc,0}$, which is only available at the decoder.

A residual frame, G, is generated, wherein $$G = F - F_c \qquad (1)$$

In one embodiment, G is lossy encoded into a redundant bit-stream layer. In another embodiment, G is Wyner-Ziv encoded.

The decoder recovers an estimate, G', by decoding the Wyner-Ziv layer based on residual side information, $G_{si}$, wherein $$G_{si} = F_{erc,0} - F_c \qquad (2)$$

Accordingly, the Wyner-Ziv decoded frame is $$F_{erc\text{-}wz,0} = G' + F_c \qquad (3)$$

The Wyner-Ziv decoded frame, once attained, is fed back into a decoder-search based error concealment module used to obtain a final reconstruction, wherein final reconstruction is $F_{erc,1}$. It should be appreciated $F_{erc,1}$ is expected to be a closer approximation to F than $F_{erc,0}$.

The decoding process for the Wyner-Ziv layer followed by decoder motion search can be iterated based on progressively better error-concealed versions generated at the Wyner-Ziv decoder. In other words, a first iteration uses $F_{erc,0}$ as side information and $F_{erc,0} - F_c$ as residual side information to obtain the final error concealed frame.

A second iteration, based in part on the first iteration, as described above, is a progressively better error concealed version. In a second iteration, $F_{erc,1}$ is used as side information and $G_{si} = F_{erc,1} - F_c$ is used as residual side information, to obtain $F_{erc,2}$, as the final reconstruction.

In other words, the Wyner-Ziv bitstream is $B_{wz}$. The decoding process for the Wyner-Ziv layer to yield the decoded frame $F_{erc\text{-}wz,i}$ based on side information $F_{erc,i}$ in the ith iteration is DecWZ, such that $$F_{erc\text{-}wz,i} = DecWZ(B_{wz}, F_c, F_{erc,i}) \qquad (4)$$

The decoder motion search (DMS) based final reconstruction process based on previously decoded frames yields the final error concealed frame $F_{erc,i+1}$ at the end of the ith iteration, such that $$F_{erc,i+1} = DMS(F_{erc\text{-}wz,i}, \text{list of previously decoded frames}) \qquad (5)$$

It should be appreciated that Equation 4 and Equation 5 are iterated for i=0, 1, 2, . . . , j−1, and the final reconstruction is $F_{erc,j}$.

It should be appreciated that depending on the target redundancy rate, it is possible to choose a S with S lying between 0 and R−1 to code the Wyner-Ziv layer at resolution $2^{-S}$ of horizontal and vertical dimensions of the full resolution image. It should be appreciated that R and S controls the downsampling factor for the preview and refinement layer (Wyner-Ziv layer), respectively. For example, the preview layer has a resolution of $2^{-R}$ times that of the full resolution, in both dimensions, while the refinement layer (encoded by distributed coder 135) has a resolution of $2^{-S}$ times that of the full resolution. In one embodiment, if R=2 and S=1, then the preview layer is a quarter resolution and the Wyner-Ziv layer is coded at half resolution. In another embodiment, if S>0, additional Wyner-Ziv layers can be added to provide progressively higher resolution reconstructions.

In one embodiment, a refined version of $F_c$ is used to determine the residues, instead of an upsampled preview version. In another embodiment, the encoder and decoder can both generate a higher quality version of $F_c$, denoted $F_{cr}$, by motion search and selective replacement from a list of recently acknowledged frames. This is possible because the refined $F_{cr}$ version is likely to be closer to the original F than the $F_c$. Therefore, the energy in the residue would be substantially reduced, leading to improvement in the overall performance.

In one embodiment, there is a low redundancy rate that results in good quality of error concealment. In another embodiment, data partitioning is not required to protect the motion vectors and coding modes. In another embodiment, iterative decoding enables taking full advantage of information available in the decoder's frame buffer with correctly received frames. In one embodiment, the preview layer provides a high enough lower bound on the quality of concealment which reduces the probability of the objectionable artifacts, while allowing recovery of information in higher frequencies with the Wyner-Ziv layer.

Embodiments of the present invention provide for error detection and correction in low-latency video communications over best-effort networks by employing an additional lower resolution and robustly coded copy of the source video. Embodiments of the present invention can be combined with previously decoded frames to achieve effective concealment of isolated and burst losses even under tight delay constraints with a proportionately small increase to rate overhead.

Various embodiments of the present invention, encoding video data and decoding video data, are thus described. While the present invention has been described in particular embodiments, it should be appreciated that the present invention should not be construed as limited by such embodiments, but rather construed according to the following claims.

What is claimed is:

1. A computer-implemented method for decoding video data, said method comprising:
receiving a first video stream comprising a first plurality of frames encoded at a first resolution, a second video stream comprising a second plurality of frames encoded at a second resolution and a residual bitstream encoded at a third resolution, wherein said second plurality of frames encoded at said second resolution correspond to said first plurality of frames encoded at said first resolution and wherein said first resolution is greater than said second resolution and said third resolution is at least between said first and second resolutions;

determining side information based at least in part on said first plurality of frames and said second plurality of frames; and decoding said first video stream and said second video stream contemporaneously, wherein said first video stream is decoded into a first reconstructed video stream and said second video stream is decoded into a second reconstructed video stream;

decoding said residual bitstream into decoded residue based at least in part on said side information and said residual bitstream;

constructing a third reconstructed video stream by combining said decoded residue and said second reconstructed video stream; and comparing said first reconstructed video stream to said third reconstructed video stream.

2. The computer-implemented method of claim 1 wherein said decoding said video data comprises:

in response to identifying a missing portion of a first frame encoded at said first resolution, comparing said first frame with at least one third frame of a plurality of third frames at said third resolution that corresponds to said first frame, wherein said at least one third frame is based at least on said side information and at least one second frame of said second plurality of frames.

3. The computer-implemented method of claim 2 further comprising:

correcting said first frame based at least on said comparing said first frame with said third frame, wherein said corrected first frame is an error concealed frame.

4. The computer-implemented method of claim 1, wherein said side information comprises:

Wyner-Ziv side information based at least on a group consisting essentially of: said first plurality of frames encoded at said first resolution, said second plurality of frames encoded at said second resolution or a plurality of third frames.

5. The computer-implemented method of claim 1, wherein said decoding further comprises:

decoding said residual bitstream based at least in part on said side information and generating a third frame based at least in part on combining said decoded residual bitstream with a corresponding second frame.

6. The computer-implemented method of claim 5, wherein said side information comprises:

a comparison of a first residual frame of said plurality of first frames and a second frame of said plurality of second frames.

7. The computer-implemented method of claim 2 wherein said comparing said first frame with said third frame comprises:

performing an error estimation between at least one portion of said first frame and a collocated portion of said third frame; and determining whether said error estimation satisfies a threshold indicating consistency between said first frame and said third frame.

8. The computer-implemented method of claim 1 wherein said decoding said video data comprises at least one iteration:

in response to identifying a missing portion of a first frame encoded at said first resolution, concealing said first frame with at least one frame of a plurality of frames that corresponds to said first frame, wherein said at least one frame of a plurality of frames has a lower resolution than said first resolution;

enhancing said concealed first frame based at least in part on said side information; and further concealing said enhanced concealed first frame with said at least one frame of a plurality of frames that corresponds to said enhanced concealed first frame, wherein said at least one frame of a plurality of frames has a lower resolution than said first resolution.

9. The computer-implemented method of claim 1 wherein said method further comprising:

decoding cosets for distributed coded macro-blocks, wherein said decoding cosets for distributed coded macro-blocks comprising:

determining a transform of said side information; and determining encoded transform coefficients by combining said side information and a transmitted coset index.

10. A computer-implemented method for encoding video data, said method comprising:

receiving video data at a first encoder;

encoding said video data into a first video stream comprising a first plurality of frames at a first resolution by said first encoder;

encoding said first video stream into a second video stream comprising a second plurality of frames at a second resolution by a second encoder, wherein said first resolution is greater than said second resolution, and wherein said second plurality of frames encoded at said second resolution correspond to said first plurality of frames encoded at said first resolution; and encoding residue of said first video stream and said second video stream into a third video stream comprising a third resolution by a third encoder, wherein said third resolution is at least between said first resolution and said second resolution;

transmitting said first video stream at said first encoder;

transmitting said second video stream at said second encoder, wherein said first video stream and said second video stream are transmitted such that said second plurality of frames that corresponds with said first plurality of frames are contemporaneously received at a decoder and contemporaneously decoded; and transmitting said third video stream.

11. The computer-implemented method of claim 10 wherein said encoded residue comprises:

Wyner-Ziv encoded information.

12. The computer-implemented method of claim 10 wherein said encoding residue comprises:

processing macro-blocks from said residue of said first video stream and said second video stream; and classifying said macro-blocks, wherein said classified macro-blocks are at least a group consisting essentially of: not coded, entropy coded, or distributed source coded.

13. The computer-implemented method of claim 10 wherein said encoding residue comprises:

distributed coding macro-blocks from said residue of said first video stream and said second video stream, wherein said distributed coding macro-blocks comprises:

quantizing transform coefficients of said distributed coded macro-blocks;

generating cosets with parameters corresponding to statistics of a plurality of macro-block classifications; and determining coset indices based at least in part on said generated cosets.

14. A non-transitory computer-readable storage medium for storing instructions that when executed by one or more processors perform a method for decoding video data, said method comprising:
  receiving a first video stream comprising a first plurality of frames encoded at a first resolution, a second video stream comprising a second plurality of frames encoded at a second resolution and a residual bit stream encoded at a third resolution, wherein said second plurality of frames encoded at said second resolution corresponds to at least a subset of said first plurality of frames encoded at said first resolution, and wherein said first resolution is greater than said second resolution and said third resolution is at least between said first resolution and said second resolution;
  determining side information based at least in part on a comparison of said first plurality of frames and said second plurality of frames;
  decoding said first video stream and said second video stream contemporaneously, wherein said first video stream is decoded into a first reconstructed video stream and said second video stream is decoded into a second reconstructed video stream;
  upsampling said second reconstructed video stream into an upsampled reconstructed video stream
  decoding said residual bit stream into decoded residue based at least in part on said side information and said residual bit stream;
  constructing a third reconstructed video stream by combining said decoded residue and said upsampled reconstructed video stream; and
  in response to identifying a missing portion of a first frame of said first plurality of frames encoded at said first resolution, comparing said first reconstructed video stream to said third reconstructed video stream.

15. The non-transitory computer-readable storage medium of claim 14 wherein said method further comprises:
  correcting said first frame based at least in part on said comparing said first frame with said second frame.

16. The non-transitory computer-readable storage medium of claim 14 wherein said method further comprises:
  correcting said first frame based at least in part on said comparing said first frame with at least one third frame of a plurality of third frames comprised within said third reconstructed video stream.

17. The non-transitory computer-readable storage medium of claim 14 wherein said comparing said first frame with said second frame comprises:
  performing an error estimation between at least one portion of said first frame and a collocated portion of said second frame; and
  determining whether said error estimation satisfies a threshold indicating consistency between said first frame and said second frame.

18. The non-transitory computer-readable storage medium of claim 14 wherein said comparing said first frame with said third frame comprises:
  performing an error estimation between at least one portion of said first frame and a collocated portion of said third frame; and
  determining whether said error estimation satisfies a threshold indicating consistency between said first frame and said third frame.

19. The non-transitory computer-readable storage medium of claim 14, said method further comprising at least one iteration:
  concealing said first frame with at least one frame of a plurality of frames that corresponds to said first frame, wherein said at least one frame of a plurality of frames has a lower resolution than said first resolution;
  enhancing said concealed first frame based at least in part on said side information; and
  further concealing said enhanced concealed first frame with said at least one frame of a plurality of frames that corresponds to said enhanced concealed first frame, wherein said at least one frame of a plurality of frames has a lower resolution than said first resolution.

20. The non-transitory computer-readable storage medium of claim 14, wherein said side information comprises:
  Wyner-Ziv side information based at least on a group consisting essentially of: said first plurality of frames encoded at said first resolution, said second plurality of frames encoded at said second resolution or said third plurality of frames.

* * * * *